US00RE40499E

(19) United States
(12) Reissued Patent
Lifson

(10) Patent Number: US RE40,499 E
(45) Date of Reissued Patent: Sep. 16, 2008

(54) PULSED FLOW FOR CAPACITY CONTROL

(75) Inventor: Alexander Lifson, Manlius, NY (US)

(73) Assignee: Carrier Corporation, Farmington, CT (US)

(21) Appl. No.: 09/921,334

(22) Filed: Aug. 3, 2001

Related U.S. Patent Documents

Reissue of:
(64) Patent No.: 6,047,556
Issued: Apr. 11, 2000
Appl. No.: 08/986,447
Filed: Dec. 8, 1997

(51) Int. Cl.
*F25B 3/00* (2006.01)
*F25B 41/00* (2006.01)
*F25B 1/00* (2006.01)
*F04B 49/00* (2006.01)

(52) U.S. Cl. ..... 62/196.2; 62/196.4; 62/217; 62/228.1; 62/513; 251/129.5; 417/298

(58) Field of Classification Search ..... 62/196.2, 62/196.4, 217, 228.1, 513; 251/129.05; 417/212, 417/298
See application file for complete search history.

(56) References Cited

U.S. PATENT DOCUMENTS 4,132,086 A * 1/1979 Kountz ..... 62/209
4,838,037 A * 6/1989 Wood ..... 62/225
4,854,130 A * 8/1989 Naruse et al. ..... 62/352
5,015,155 A 5/1991 Brown
5,022,234 A * 6/1991 Goubeaux ..... 62/228.5
5,063,750 A * 11/1991 Englund ..... 62/196.3
5,226,472 A * 7/1993 Benevelli et al. ..... 165/263
5,611,674 A 3/1997 Bass et al.
5,634,350 A * 6/1997 De Medio ..... 62/217
5,741,120 A 4/1998 Bass et al.
5,816,055 A * 10/1998 Ohman ..... 62/117
6,038,871 A * 3/2000 Gutierret et al. ..... 62/133
6,047,557 A 4/2000 Pham et al.
6,206,652 B1 * 3/2001 Caillat ..... 417/298
6,213,731 B1 * 4/2001 Doepker et al. ..... 417/220
6,393,852 B2 5/2002 Pham et al.
6,408,635 B1 6/2002 Pham et al.
6,438,974 B1 8/2002 Pham et al.

FOREIGN PATENT DOCUMENTS

JP S57-162988/1982 4/1981
JP S61-107989/1986 7/1986
JP S62-29779/1987 2/1987
JP S62-125262/1987 6/1987
JP S62-125263/1987 6/1987
JP S61-138490/1988 12/1988

* cited by examiner

*Primary Examiner*—Marc Norman
(74) *Attorney, Agent, or Firm*—Kinney & Lange P.A.

(57) ABSTRACT

Step control in capacity modulation of a refrigeration or air conditioning circuit is achieved by rapidly cycling a solenoid valve in the suction line, economizer circuit or in a bypass with the percent of "open" time for the valve regulating the rate of flow therethrough. A common port in the compressor is used for economizer flow and for bypass.

30 Claims, 1 Drawing Sheet

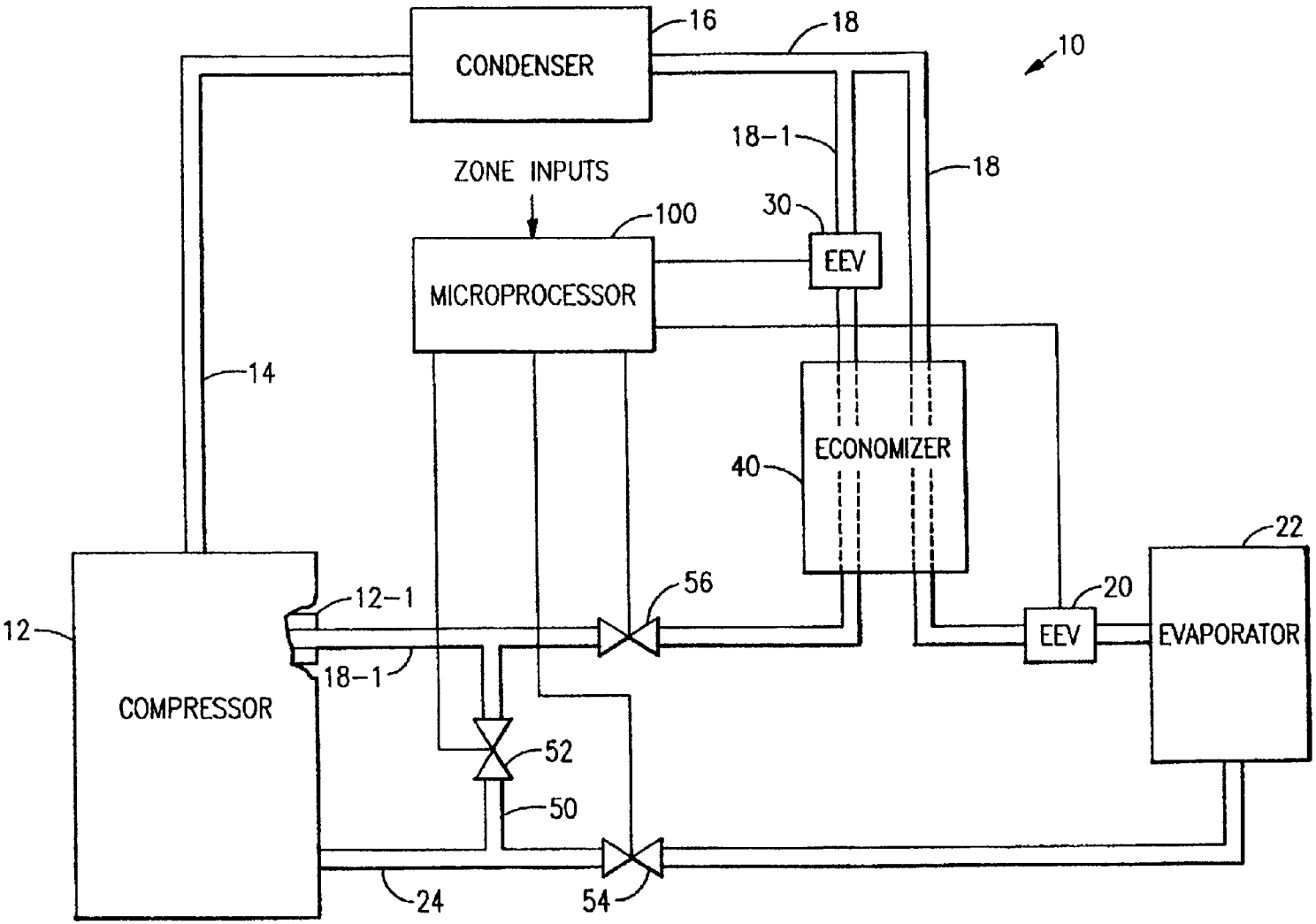
10
CONDENSER
16
18
18
18-1
EEV
30
ZONE INPUTS
MICROPROCESSOR
100
ECONOMIZER
40
EEV
20
EVAPORATOR
22
56
52
50
54
24
12-1
18-1
14
COMPRESSOR
12

PULSED FLOW FOR CAPACITY CONTROL

Matter enclosed in heavy brackets [ ] appears in the original patent but forms no part of this reissue specification; matter printed in italics indicates the additions made by reissue.

BACKGROUND OF THE INVENTION

In a closed air conditioning or refrigeration system there are a number of methods of unloading that can be employed. Commonly assigned U.S. Pat. No. 4,938,666 discloses unloading one cylinder of a bank by gas bypass and unloading an entire bank by suction cutoff. Commonly assigned U.S. Pat. No. 4,938,029 discloses the unloading of an entire stage of a compressor and the use of an economizer. Commonly assigned U.S. Pat. No. 4,878,818 discloses the use of a valved common port to provide communication with suction for unloading or with discharge for $V_i$ control, where $V_i$ is the discharge pressure to suction pressure ratio. In employing these various methods, the valve structure is normally fully open, fully closed, or the degree of valve opening is modulated so as to remain at a certain fixed position. One problem associated with these arrangements is that capacity can only be controlled in steps or expensive motor driven modulation valves must be employed to fix the valve opening at a certain position for capacity control.

SUMMARY OF THE INVENTION

Gradual compressor capacity can be achieved by rapidly cycling solenoid valve(s) between fully open and fully closed positions. The cycling solenoid valve(s) can be located in the compressor suction line, the compressor economizer line and/or the compressor bypass line which connects the economizer line to the suction line. The percentage of time that a valve is open determines the degree of modulation being achieved. However, because the cycling time is so much shorter than the response time of the system, it is as though the valve(s) are partially opened rather than being cycled between their open and closed positions.

It is an object of this invention to provide continuous capacity control.

It is another object of this invention to provide step control in capacity modulation.

It is a further object of this invention to provide a less expensive alternative to the use of variable speed compressors.

It is another object of this invention to provide a less expensive alternative to a modulation valve. These objects, and others as will become apparent hereinafter, are accomplished by the present invention.

Basically, gradual or step control in capacity modulation of a refrigeration circuit is achieved by rapidly cycling a solenoid valve in the compressor suction line and/or the compressor economizer line and/or bypass line.

BRIEF DESCRIPTION OF THE DRAWING

For a fuller understanding of the present invention, reference should now be made to the following detailed description thereof taken in conjunction with the accompanying drawing wherein.

The FIGURE is a schematic representation of an economized refrigeration or air conditioning system employing the present invention.

DESCRIPTION OF THE PREFERRED EMBODIMENT

In the FIGURE, the numeral 12 generally designates a hermetic compressor in a closed refrigeration or air conditioning system 10. Starting with compressor 12, the system 10 serially includes discharge line 14, condenser 16, line 18, expansion device 20, evaporator 22, and suction line 24 completing the circuit. Line 18-1 branches off from line 18 and contains expansion device 30 and connects with compressor 12 via port 12-1 at a location corresponding to an intermediate point in the compression process. Economizer heat exchanger 40 is located such that line 18-1, downstream of expansion device 30, and line 18, upstream of expansion device 20, are in heat exchange relationship. The expansion devices 20 and 30 are labeled as electronic expansion devices, EEV, and are illustrated as connected to microprocessor 100. In the case of expansion device 20, at least, it need not be an EEV and might, for example, be a thermal expansion device, TEV. What has been described so far is generally conventional. The present invention provides bypass line 50 connecting lines 18-1 and 24 downstream of economizer heat exchanger 40 and evaporator 22, respectively, and places solenoid valve 52 in line 50, solenoid valve 54 in line 24 downstream of evaporator 22 and upstream of line 50 and solenoid valve 56 in line 18-1 downstream of economizer heat exchanger 40 and upstream of line 50. Solenoid valves 52, 54, and 56 and EEV30 are all controlled by microprocessor 100 responsive to zone inputs. Where expansion device 20 is, as illustrated, an EEV, it also is controlled by microprocessor 100.

In "normal" operation of system 10, valves 52 and 56 are closed and hot high pressure refrigerant gas from compressor 12 is supplied via line 14 to condenser 16 where the refrigerant gas condenses to a liquid which is supplied via line 18 and idle economizer heat exchanger 40 to EEV20. EEV20 causes a pressure drop and partial flashing of the liquid refrigerant passing therethrough. The liquid-vapor mixture of refrigerant is supplied to evaporator 22 where the liquid refrigerant evaporates to cool the required space and the resultant gaseous refrigerant is supplied to compressor 12 via suction line 24 containing solenoid valve 54 to complete the cycle.

The operation described above is conventional and capacity is controlled through EEV20. Pursuant to the teachings of the present invention solenoid valve 54 can be rapidly pulsed to control the capacity of compressor 12. Since the pulsing will be more rapid than the response time of the system 10, the system 10 responds as though the valve 54 is partially open rather than being cycled between its open and closed positions. Modulation is achieved by controlling the percentage of the time that valve 54 is on and off. To prevent a vacuum pump operation, the "off" position of valve 54 may need to permit a limited flow.

To increase capacity of system 10, economizer heat exchanger 40 is employed. In economizer heat exchanger 40, lines 18 and 18-1 are in heat exchange relationship. Solenoid valve 56 is open and solenoid valve 52 closed and a portion of the liquid refrigerant in line 18 is directed into line 18-1 where EEV30 causes a pressure drop and a partial flashing of the liquid refrigerant. The low pressure liquid refrigerant passes into economizer heat exchanger 40 where the refrigerant in line 18-1 extracts heat from the refrigerant in line 18 causing it to cool further and thereby provide an increased cooling effect in evaporator 22. The refrigerant in line 18-1 passing through economizer heat exchanger 40 is supplied to compressor 12 via port 12-1 under the control of valve 56 which is, in turn, controlled by microprocessor 100. Line 18-1 delivers refrigerant gas to a trapped volume at an intermediate stage of compression in the compressor 12, as is conventional. However, according to the teachings of the present invention the economizer flow in line 18-1 and, as such, system capacity is controlled by rapidly cycling valve 56 to modulate the amount of economizer flow to an intermediate stage of compression in compressor 12. To lower the capacity of system 10, bypass line solenoid valve 52 is employed. In this arrangement, valve 56 is closed, and gas at intermediate pressure is bypassed from compressor 12 via port 12-1, line 18-1 and line 50 into suction line 24. The amount of bypassed gas and, as such, the system capacity is varied by rapidly cycling valve 52. Thus port 12-a is used as both an economizer port and a bypass or unloading port.

From the foregoing, it should be clear that the rapid cycling of valves 52, 54 and 56, individually, allows for various forms of capacity control with the amount of time a particular valve is on relative to the time that it is off determining the degree of modulation of capacity. The frequency of modulation for typical systems can range from 0.1 to 100 seconds.

Although preferred embodiments of the present invention have been illustrated and described, other changes will occur to those skilled in the art. It is therefore intended that the scope of the present invention is to be limited only by the scope of the appended claims.

What is claimed is:

1. In a system serially including a compressor, a discharge line, a condenser, an expansion device, an evaporator and a suction line, means for achieving capacity control comprising:

a solenoid valve in said suction line;

means for rapidly pulsing said solenoid valve whereby the rate of flow in said suction line to said compressor is modulated;

a fluid path extending from a point intermediate said condenser and said expansion device to said compressor at a location corresponding to an intermediate point of compression in said compressor;

a bypass line connected to said fluid path and said suction line;

a solenoid valve in said bypass line;

means for rapidly pulsing said solenoid valve in said bypass line whereby the rate of flow of bypass to said suction line is modulated.

2. The capacity control of claim 1 further including:

an economizer circuit connected to said fluid path;

a solenoid valve in said economizer circuit; and means for rapidly pulsing said solenoid valve in said economizer circuit whereby the rate of economizer flow to said compressor is modulated.

3. In a system serially including a compressor, a discharge line, a condenser, an expansion device, an evaporator and a suction line, means for achieving capacity control comprising:

a solenoid valve in said suction line;

means for rapidly pulsing said solenoid valve whereby the rate of flow in said suction line to said compressor is modulated;

a fluid path extending from a point intermediate said condenser and said expansion device to said compressor at a location corresponding to an intermediate point of compression in said compressor;

an economizer circuit connected to said fluid path;

a solenoid valve in said economizer circuit; and means for rapidly pulsing said solenoid valve in said economizer circuit whereby the rate of economizer flow to said compressor is modulated.

*4. An air conditioning or refrigeration system comprising:*

*an evaporator;*

*a compressor;*

*a refrigeration fluid suction line from the evaporator to the compressor, the refrigeration fluid suction line operative to carry refrigeration fluid from the evaporator to the compressor;*

*a capacity controller operative to generate capacity control signals for capacity modulation; and*

*a suction line valve, in the refrigeration fluid suction line, operatively connected to the capacity controller to receive the capacity control signals from the capacity controller, and operable to alternate between fully open and fully closed positions in response to the capacity control signals with a cycling time shorter than the response time of the system to modulate compressor capacity;*

*wherein the suction line valve in the fully closed position permits a limited fluid flow through the refrigeration fluid suction line.*

*5. The air conditioning or refrigeration system of claim 4, wherein the capacity controller comprises a microprocessor.*

*6. The air conditioning or refrigeration system of claim 4, wherein the suction line valve is a solenoid valve.*

*7. An air conditioning or refrigeration system comprising:*

*an evaporator;*

*a compressor;*

*a refrigeration fluid suction line from the evaporator to the compressor, the refrigeration fluid suction line operative to carry refrigeration fluid from the evaporator to the compressor;*

*a capacity controller operative to generate capacity control signals for capacity modulation; and*

*a solenoid valve, in the refrigeration fluid suction line, operatively connected to the capacity controller to receive the capacity control signals from the capacity controller, and operable to alternate between fully open and fully closed positions in response to the capacity control signals to modulate compressor capacity;*

*wherein the solenoid valve in the fully closed position permits a limited fluid flow through the refrigeration fluid suction line.*

*8. The air conditioning or refrigeration system of claim 7, wherein the capacity controller comprises a microprocessor.*

*9. A capacity modulated compressor for an air conditioning or refrigeration system comprising:*

*a compressor housing comprising a compression chamber, a refrigeration fluid suction line operative to pass refrigerant to the compression chamber, and at least one refrigerant discharge line operative to pass compressed refrigerant from the compression chamber;*

*a capacity controller operative to generate capacity control signals corresponding to desired capacity modulation; and*

*a suction line valve, in the refrigeration fluid suction line, operatively connected to the capacity controller to receive the capacity control signals from the capacity controller, and operable to alternate between fully open and fully closed positions in response to the capacity control signals with a cycling time shorter than the response time of the system to modulate compressor capacity;*

*wherein the suction line valve in the fully closed position permits a limited fluid flow through the refrigeration fluid suction line.*

*10. The capacity modulated compressor of claim 9, wherein the suction line valve is disposed in the refrigeration fluid suction line upstream with respect to refrigerant flow to at least one refrigerant inlet port.*

*11. The capacity modulated compressor of claim 9, wherein the capacity controller comprises a microprocessor.*

*12. The capacity modulated compressor of claim 9, wherein the suction line valve is a solenoid valve.*

*13. A capacity modulated compressor for an air conditioning or refrigeration system comprising:*

*a compressor housing comprising a compression chamber, at least one refrigerant suction line operative to pass refrigerant to the compression chamber, and at least one refrigerant discharge line operative to pass compressed refrigerant from the compression chamber;*

*a capacity controller operative to generate capacity control signals corresponding to desired capacity modulation; and*

*a solenoid valve, in the refrigerant suction line, operatively connected to the capacity controller to receive the capacity control signals from the capacity controller, and operable to alternate between fully open and fully closed positions in response to the capacity control signals with a cycling time shorter than the response time of the system to modulate compressor capacity;*

*wherein the solenoid valve in the fully closed position permits a limited fluid flow through the refrigerant suction line.*

*14. The capacity modulated compressor of claim 13, wherein the solenoid valve is disposed in the refrigerant suction line upstream with respect to refrigerant flow to at least one refrigerant inlet port.*

*15. The capacity modulated compressor of claim 13, wherein the capacity controller comprises a microprocessor.*

*16. An air conditioning or refrigeration system comprising:*

*an evaporator;*

*a compressor in fluid communication with the evaporator;*

*a refrigeration fluid suction line operative to pass refrigeration fluid into the compressor;*

*a capacity controller operative to generate capacity control signals corresponding to desired capacity modulation; and*

*a suction line valve operatively connected to the capacity controller to receive the capacity control signals from the capacity controller, and operable to alternate between fully open and fully closed positions in response to the capacity control signals with a cycling time shorter than the response time of the system to modulate compressor capacity;*

*wherein a limited fluid flow is permitted into the compressor through the refrigeration fluid suction line when the suction line valve is in the fully closed position.*

*17. The air conditioning or refrigeration system of claim 16, wherein the capacity controller comprises a microprocessor.*

*18. The air conditioning or refrigeration system of claim 16, wherein the suction line valve is a solenoid valve.*

*19. The air conditioning or refrigeration system of claim 16, wherein the suction line valve is disposed in the refrigeration fluid suction line upstream with respect to refrigerant flow to at least one refrigerant inlet port.*

*20. An air conditioning or refrigeration system comprising:*

*an evaporator;*

*a compressor;*

*a refrigeration fluid suction line from the evaporator to the compressor, the refrigeration fluid suction line operative to carry refrigeration fluid from the evaporator to the compressor;*

*a capacity controller operative to generate capacity control signals corresponding to desired capacity modulation; and*

*a suction line valve, in the refrigeration fluid suction line, operatively connected to the capacity controller to receive the capacity control signals from the capacity controller, and operable to alternate between fully open and fully closed positions in response to the capacity control signals with a cycling time shorter than the response time of the system to modulate compressor capacity;*

*the refrigeration fluid suction line having a first condition in which a limited fluid flow is permitted through the refrigerant flow line when the suction line valve is in the fully closed position.*

*21. The air conditioning or refrigeration system of claim 20, wherein the refrigeration fluid suction line has a second condition in which no fluid flow is permitted through the refrigeration fluid suction line when the suction line valve is in the fully closed position.*

*22. The air conditioning or refrigeration system of claim 20, wherein the capacity controller comprises a microprocessor.*

*23. The air conditioning or refrigeration system of claim 20, wherein the suction line valve is a solenoid valve.*

*24. The air conditioning or refrigeration system of claim 20, wherein the suction line valve is disposed in the refrigeration fluid suction line upstream with respect to refrigerant flow to at least one refrigerant inlet port.*

*25. A method of modulating the capacity of a compressor in a closed refrigerant circulating system, the compressor comprising a compression chamber in fluid communication with a refrigerant suction line of the system through which refrigerant fluid is supplied to the compression chamber, comprising:*

*rapidly pulsing a suction line valve, disposed in the refrigerant suction line, between a fully open position and a fully closed position to modulate compressor capacity, the refrigeration fluid suction line having a first condition in which a limited fluid flow is permitted through the refrigerant suction line when the suction line valve is in the fully closed position.*

*26. The method of claim 25, wherein the refrigerant suction line has a second condition in which no fluid flow is permitted through the refrigerant suction line when the suction line valve is in the fully closed position.*

*27. The method of claim 25, wherein pulsing the suction line valve comprises pulsing the suction line valve with a cycling time shorter than the response time of the system to modulate compressor capacity.*

*28. The method of claim 25, wherein the pulsing is controlled by a microprocessor.*

*29. The method of claim 25, wherein the suction line valve is a solenoid valve.*

*30. The method of claim 25, wherein the suction line valve is disposed in the refrigerant suction line upstream with respect to refrigerant flow to at least one refrigerant inlet port.*

* * * * *